UNITED STATES PATENT OFFICE.

WALTER ROBINSON, OF ONONDAGA, ASSIGNOR OF FIVE-EIGHTHS TO SCHUYLER W. TERRY AND LOTTIE S. TERRY, OF SYRACUSE, NEW YORK.

PLASTERING COMPOSITION.

SPECIFICATION forming part of Letters Patent No. 471,081, dated March 15, 1892.

Application filed August 22, 1890. Serial No. 362,773. (No specimens.)

*To all whom it may concern:*

Be it known that I, WALTER ROBINSON, of the town and county of Onondaga, and State of New York, have invented new and useful Improvements in Plastering Compositions, of which the following is a clear, full, and exact description.

My invention relates to the composition of wall-plaster for architectural purposes, &c.

My object is to produce a composition of matter to be used for plastering walls and other architectural purposes, &c., cheap in composition and of great utility.

My invention consists in the several novel ingredients hereinafter described, and specially set forth in the claim annexed.

My invention consists of mixing and commingling plaster-of-paris, whiting, sand, and glue with water in sufficient quantities to make it pliable.

I have found by repeated experiments that by mixing and commingling the aforesaid ingredients together with quicklime that a white hard plaster is produced, the glue acting to retard the setting of the composition and the whiting and quicklime acting to facilitate the spreading qualities, and the whiting alone serves to toughen and make elastic plaster on the wall.

The composition consists in mixing and commingling the above-named ingredients in substantially the following proportions: whiting, three pecks; plaster-of-paris, one peck; sand, one peck; glue, two ounces; quicklime, one-half peck.

What I claim, and desire to secure by Letters Patent, is—

The herein-described composition for wall-plaster, consisting of plaster-of-paris, sand, glue, whiting, and quicklime, as set forth.

In witness whereof I have hereunto set my hand and seal this 21st day of August, 1890.

WALTER ROBINSON. [L. S.]

Witnesses:
   W. J. DOLAN,
   C. E. SHATTUCK.